May 9, 1944. Q. E. BASHORE 2,348,186
MEANS FOR TAPERING ENDS OF TUBULAR OBJECTS
Filed April 23, 1943
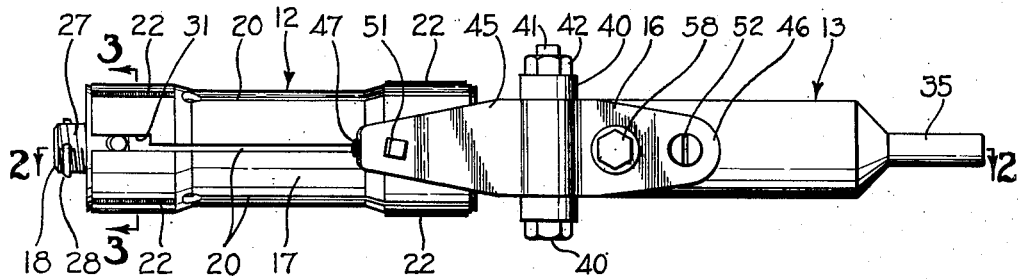
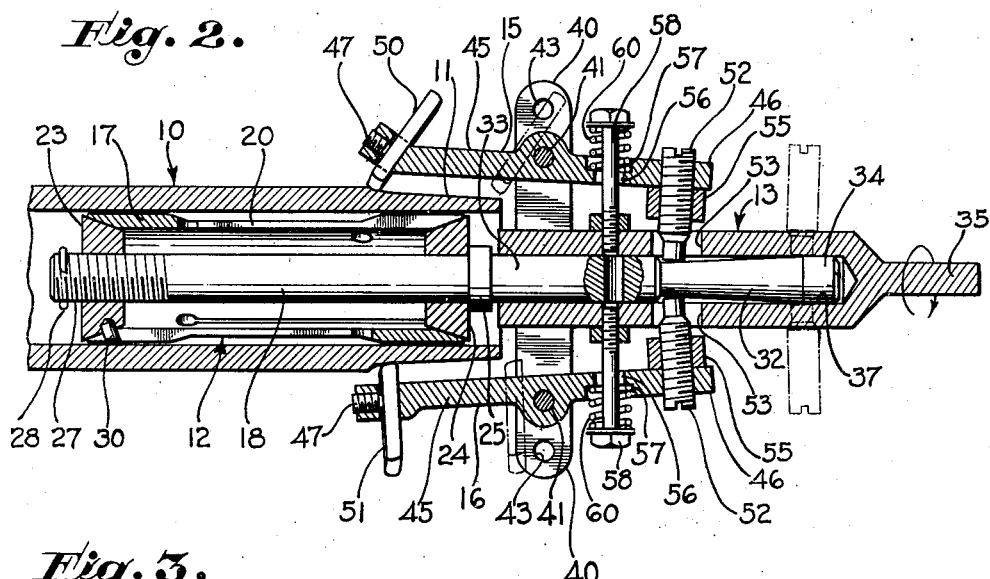
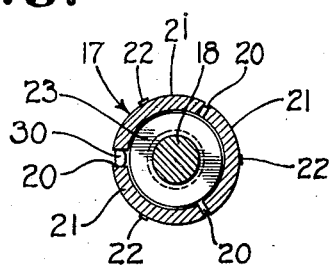
INVENTOR
QUINTER E. BASHORE
BY HARRIS, KIECH, FOSTER & HARRIS
ATTORNEYS Patented May 9, 1944

2,348,186

UNITED STATES PATENT OFFICE 2,348,186

MEANS FOR TAPERING ENDS OF TUBULAR OBJECTS

Quinter E. Bashore, Covina, Calif.

Application April 23, 1943, Serial No. 484,222

16 Claims. (Cl. 82—17)

My invention relates to machining devices and is directed particularly to improvements in portable devices for cutting the ends of tubular objects to tapered or conical configuration.

Since the invention has been initially embodied in a portable tool for use in the field to taper ends of conduit, such embodiment is selected for the purpose of the present disclosure. Those skilled in the art will find in my description adequate guidance for applying the invention to other purposes in other fields.

Lengths of pipe and conduit for various purposes are commonly joined together in the course of installation by telescoping the end of one length into the adjacent end of the next length, usually with suitable cement or sealing material applied to the telescoping surfaces. The invention is being used initially for the installation of underground electrical conduit in air fields, which conduit is made of a fibrous composition including as ingredients asbestos fiber and suitable cement.

Each factory length of the composition conduit is supplied with an external taper at each end and with a complementary tapered coupling for joining purposes. For a long run, it is merely necessary to fit together the factory lengths until the ends of the run is reached. The last length of the run, however, must be cut and the cut end of the conduit must be tapered externally for the purpose of making a proper joint. Usually, the cut end of the conduit is joined to a suitable outlet box or rigid conduit. To make a juncture with an outlet box, the externally tapered end of the conduit is fitted into the internally tapered end of a special sleeve, and the sleeve in turn is connected with the outlet box by a union.

Since the wiring of an air field involves numerous short runs, it becomes necessary to finish many cut ends of conduit to the required external taper. In practice, a string of factory lengths of the composition conduit is laid along a required course and then the string is cut at numerous points for insertion of the required outlet boxes. Heretofore the practice has been either to transport the newly cut lengths of conduit to a remote shop for beveling or to provide a shop or heavy machine on wheels for use in the field.

It is one object of my invention to provide for this purpose a simple portable tool so light that it may be applied manually to the cut end of a conduit in a trench in the ground without the necessity of removing the cut length of conduit from the previously laid string. Another object of the invention is to provide such a tool in the form of a rotary device that may be attached to and actuated by a simple portable power means for employment in the well known manner of a manually portable rotary drill.

Heretofore the heavy machines for tapering the cut ends of such composition conduit have been grinding devices requiring five to ten minutes to process a conduit end. One object of my invention is to provide a rotary cutting device to accomplish the same task in less than a minute. Another object is to make such a tool adjustable in a simple manner for beveling conduit of different diameters. A still further object is to provide a tool that will not only bevel a conduit end but also will automatically correct any departure of the conduit from cylindrical configuration. Thus the end of a fibrous conduit that flattens slightly out of round from lying in the sun over an extended period of time is automatically reshaped by my device prior to the cutting operation.

Other objects and advantages of my invention will be apparent in the detailed description to follow, taken with the accompanying drawing.

In the drawing, which is to be regarded merely as illustrative,

Fig. 1 is a side elevation of the preferred embodiment of my invention;

Fig. 2 is a longitudinal section taken as indicated by the line 2—2 of Fig. 1; and Fig. 3 is a transverse section taken as indicated by the line 3—3 of Fig. 1.

In the drawing, the numeral 10 generally designates a conduit of fibrous composition, the end of which is cut by my device to a taper or bevel, the finished bevel being indicated by numeral 11. The principal parts of the illustrated device for cutting this bevel include: a mandrel generally designated 12 adapted to be inserted in the end of the conduit in a fixed manner; a rotary means generally designated 13 adapted to telescope rotatably over a protruding portion of the mandrel; and at least one tool-holder means carried by the rotary means 13 and controlled by the mandrel 12 with respect to the depth to which the material of the conduit 10 is cut by the device. In the present form of the invention, there are two tool-holder means designated 15 and 16, respectively, positioned diametrically opposite each other.

The mandrel 12 may be adapted to expand radially into fixed engagement with the surrounding material of the conduit 10 and preferably is adapted to expand equally in various radial directions so that the mandrel in engaging the conduit automatically corrects any departure of the conduit end from true cylindrical configuration. Thus, the mandrel 12 may comprise a radially expansible cylinder 17 and an axial member 18 associated therewith for cooperation with the rotary means 13.

In the preferred form of my device, the expansible cylinder 17 is in the form of a metal tube that is extensively slit longitudinally at each end. Thus each end of the expansible cylinder 17 may have three longitudinal slots 20 dividing the end into three radially flexible longitudinal sections 21, as best shown in Fig. 3. To facilitate effective frictional engagement of the expansible cylinder 17 with the surrounding material of the conduit 10, the flexible longitudinal sections 21 may have suitably broken surfaces. One manner of providing such surfaces for the longitudinal sections 21 is to employ a welding procedure to build one up or more longitudinal ribs on each of the longitudinal sections. The drawing shows one such rib 22 of welding material on each of the longitudinal sections 21.

The opposite ends of the expansible cylinder 17 are internally tapered to conform to a forward circular wedge 23 and a rearward circular wedge 24 on which the expansible cylinder is mounted. It is merely necessary to lessen the distance between the two circular wedges to cause the cylinder to expand radially into engagement with the conduit. The rearward circular wedge 24 is shown backed against a collar or radial flange 25 on the axial member 18 in a freely rotatable manner and the forward circular wedge 23 is illustrated as internally threaded for engagement by a screw thread 27 on the forward end of the axial member. Means, such as a cotter pin 28, may be employed to limit the forward axial movement of the forward circular wedge 23 relative to the axial member 18. Preferably, suitable means is provided to prevent relative rotation between the forward circular wedge 23 and the expansible cylinder 17, for example, a pin 30 carried by the circular wedge and extending into one of the longitudinal slits 20 of the cylinder. Fig. 1 shows one of the longitudinal slits 20 cut away in the vicinity of the pin 30 as indicated at 31 to permit the use of a relatively thick pin.

Rearwardly of the expansible cylinder 17 the axial member 18 has a conically tapered portion 32 for governing the depth to which the material of the conduit 10 is cut and, additionally, has at least one cylindrical bearing portion for axial guidance of the rotary means 13. In Fig. 2 the axial member 18 is shown with a bearing portion 33 forward of the tapered portion 32 and a second bearing portion 34 rearward of the tapered portion 32.

The rotary means 13 may be of any suitable construction providing for rotation relative to the mandrel 12 with sufficient force to cut the material of the conduit 10. In the preferred form of my device, the rotary means 13 is shaped with a stem or shank 35 for engagement by the chuck of a suitable power means such as a manually portable power means commonly employed for drilling holes in metal. The rotary means 13 has an axial bore 37 dimensioned for cooperation with the two bearing portions 33 and 34 of the axial member 18 for axial guidance of the rotary means in the process of cutting away the material of the conduit 10.

For the support of the two tool-holder means 15 and 16, the rotary means 13 is provided with two radially extending brackets 40 on which the tool-holder means are mounted by suitable pivot bolts 41 carrying nuts 42. Preferably, each of the brackets 40 has a plurality of sets of holes 43 for the corresponding pivot bolt 41 so that the tool-holder means 15 and 16 may be shifted in position outwardly and inwardly for beveling conduit of various diameters. The drawing shows each of the tool-holder means 15 and 16 to be in the form of a lever having what may be termed a forward cutting arm 45 and a rearward control arm 46. Each cutting arm 45 is suitably apertured to receive a cutting tool and is provided with a suitable setscrew 47 for releasably securing the cutting tool.

As indicated in the drawing, the tool-holder means 15 may carry at a relatively advanced position a cutting tool 50 to make a preliminary rough cut and the tool-holder means 16 may carry a following cutting tool 51 of lesser inclination for a finishing cut. Preferably, at least one of the two cutting tools is turned on its axis to an angle relative to a plane perpendicular to the axis of the mandrel to cause the cutting action to lead or feed the rotary means 13 by what may be termed a screw-thread effect. Thus, the drawing shows both of the cutting tools 50 and 51 slightly twisted about their axes to cause such feeding action when the rotary means 13 is rotated in the direction indicated by the arrow in Fig. 2.

It is contemplated that the two tool-holder means 15 and 16 will cooperate with the tapered portion 32 of the mandrel to regulate the depth of cut of the two cutting means 50 and 51 as the rotary means is advanced relative to the mandrel. For this purpose I may thread a screw 52 transversely through each of the control arms 46 toward the axis of rotation, the rotary means 13 being provided with suitable openings 53 through which the screws extend into contact with the tapered portion 32 of the mandrel. To maintain the screws 52 in adjustment, lock-nuts 55 may be provided.

While the two tool-holder means 15 and 16 may be so designed that centrifugal action will tend to throw the cutting arms 45 outward and thereby urge the screws 52 against the periphery of the mandrel portion 32, I prefer to rely upon suitable yielding means to the same end. Thus, the drawing shows each control arm 46 having a bore 56 to clear a radial bolt 58 anad a counterbore 57 to seat a helical spring 60 in compression between the control arm and the head of the bolt. The springs 60 continuously urge the adjustment screws 52 into contact with the tapered mandrel portion 32.

The manner in which the device operates may be readily understood from the foregoing description. Preliminary to insertion of the mandrel 12 into the end of the conduit 10 the expansible cylinder 17 may be expanded to a degree providing for a sliding fit in the conduit. After insertion of the mandrel the axial member 18 is rotated to draw the circular wedge 23 toward the circular wedge 24, thereby to expand the cylinder 17 into gripping engagement with the surrounding material of the conduit. The operator then telescopes the rotary means 13 over the axial member 18, thereby positioning the two cutting tools 50 and 51 at the edge or rim of the conduit. Dotted lines in Fig. 2 show the approximate positions at this time of the two cutting tools and the two setscrews 52. The operator then initiates power rotation of the rotary means 13 and advances the rotary means to carry out the cutting operation. As the rotary means 13 advances, the two screws 52 progressively move radially inward as they traverse the tapered mandrel portion 32 and correspondingly cause the two cutting tools 50 and 51 to progressively move radially outward as the cutting tools advance on the conduit 10.

Preparatory to cutting a bevel on a pipe of larger diameter, the two tool-holder means 15 and 16 may be shifted to outer holes 43 on the bracket 40. Different mandrels for conduits of different diameter may be kept available or, in an alternative practice, expansible cylinders 17 of different diameters with corresponding sets of circular wedges 23 and 24 may be kept available for interchangeable mounting on the axial member 18.

The preferred practice of my invention described in detail herein will suggest to those skilled in the art various changes and substitutions under my basic concept, and I reserve the right to all such departures from my disclosure that properly lie within the scope of my appended claims.

I claim as my invention:

1. In a device of the character described for cutting an exterior bevel on the end of a tubular object, the combination of: a mandrel for insertion in the end of the tubular object in a fixed manner with a portion of the mandrel protruding therefrom; rotary means to rotatably engage said mandrel for axial guidance thereby; cutting means carried by said rotary means; and means carried by said rotary means and controlled by said mandrel portion to increase the radial distance of said cutting means from the axis of said mandrel as said rotary means is advanced relative to the tubular object.

2. In a device of the character described for cutting an exterior bevel on the end of a tubular object, the combination of: a mandrel for insertion in the end of the tubular object with a portion of the mandrel protruding therefrom, said mandrel being expansible equally in various radial directions for anchorage in said tubular object and to correct any departure of the tubular object from cylindrical configuration; rotary means to rotatably engage said mandrel for axial guidance thereby; cutting means carried by said rotary means; and means carried by said rotary means and controlled by said mandrel portion to increase the radial distance of said cutting means from the axis of said mandrel as said rotary means is advanced relative to the tubular object.

3. In a device of the character described for cutting an exterior bevel on the end of a tubular object, the combination of: a radially expansible cylinder for insertion in the end of said tubular object; an axial member carrying said cylinder, said member having a portion positioned to protrude from the end of the tubular object when said cylinder is inserted; means carried by said axial member to expand the inserted cylinder into engagement with the tubular object; rotary means to rotatably engage said axial member for axial guidance thereby; cutting means carried by said rotary means; and means carried by said rotary means and controlled by said axial member to increase the radial distance of said cutting means from the axis of said cylinder as said rotary means is advanced over the end of the tubular object.

4. In a device of the character described, a combination as set forth in claim 3 in which said cylinder is longitudinally slit for radial expansion and in which said means for expanding the cylinder is responsive to rotation of said axial member relative to the cylinder.

5. In a device of the character described for cutting an exterior bevel on the end of a tubular object, the combination of: a mandrel for partial insertion in the end of said tubular object in a fixed manner, said mandrel having a tapered portion positioned to lie outside the tubular object; rotary means to rotatably engage said mandrel for axial guidance thereby; cutting means carried by said rotary means; and means carried by said rotary means and controlled by said tapered mandrel portion to vary the radial distance of said cutting means from the axis of said mandrel as said rotary means is advanced relative to the tubular object.

6. In a device of the character described for cutting an exterior bevel on the end of a tubular object, the combination of: a mandrel for partial insertion in the end of said tubular object into fixed engagement with the tubular object, said mandrel having both a bearing portion and a tapered portion positioned to lie outside the tubular object; rotary means to rotatably telescope over said bearing portion of the mandrel for axial guidance thereby; cutting means carried by said rotary means; and means carried by said rotary means and controlled by said tapered mandrel portion to vary the radial distance of said cutting means from the axis of said mandrel as said rotary means is advanced relative to the tubular object.

7. In a device of the character described for cutting an exterior bevel on the end of a tubular object, the combination of: a mandrel having a radially expansible portion for insertion into and engagement with the end of said tubular object, said mandrel having a tapered portion positioned to lie outside the tubular object; rotary means to rotatably telescope over said portion of the mandrel for axial guidance by the mandrel; cutting means carried by said rotary means; and means carried by said rotary means and controlled by said tapered mandrel portion to vary the radial distance of said cutting means from the axis of said mandrel as said rotary means is advanced relative to the tubular object.

8. In a device of the character described for cutting an exterior bevel on the end of a tubular object, the combination of: a mandrel for partial insertion in the end of said tubular object in a fixed manner, said mandrel having a tapered portion positioned to lie outside the tubular object; cutting means; rotary means to rotatably engage said mandrel; tool-holder means mounted on said rotary means to carry said cutting means, said tool-holder means being movable to vary the cutting depth of said cutting means; and means for contact with said tapered portion to vary the radial position of said tool-holder means as said rotary means is advanced.

9. In a device of the character described for cutting an exterior bevel on the end of a tubular object, the combination of: a mandrel for partial insertion in the end of said tubular object in a fixed manner, said mandrel having a tapered portion positioned to lie outside the tubular object; rotary means to rotatably engage said mandrel; cutting means; tool-holder means mounted on said rotary means, said tool-holder means carrying said cutting means and being movably mounted on the rotary means to shift said cutting means radially relative to the axis of rotation; and yielding means to urge said tool-holder means into contact with said tapered portion of the mandrel, whereby the distance of said cutting means from the axis of rotation is progressively changed as said rotary means advances axially relative to said mandrel.

10. In a device of the character described for cutting an exterior bevel on the end of a tubular object, the combination of: a mandrel for insertion in the end of the tubular object in a fixed manner with a portion of the mandrel protruding therefrom; rotary means to rotatably engage said mandrel for axial guidance thereby; cutting means carried by said rotary means; and means carried by said rotary means and controlled by said mandrel portion to increase the radial distance of said cutting means from the axis of said mandrel as said rotary means is advanced relative to the tubular object, said cutting means being turned out of a plane perpendicular to the axis of rotation of said rotary means in a direction to cause the cutting action to feed said rotary means axially toward said tubular object.

11. In a device of the character described for cutting an exterior bevel on the end of a tubular object, the combination of: a mandrel for partial insertion in the end of said tubular object into fixed engagement with the tubular object, said mandrel having both a bearing portion and a tapered portion positioned to lie outside the tubular object; rotary means to rotatably telescope over both said portions of the mandrel, said rotary means having a bearing portion cooperative with said bearing portion of the mandrel for axial guidance of the rotary means; cutting means; tool-holder means mounted on said rotary means, said tool-holder means carrying said cutting means and being movably mounted on the rotary means to shift said cutting means radially relative to the axis of rotation; and yielding means to urge said tool-holder means into contact with said tapered portion of the mandrel, whereby the radial distance of said cutting means from the axis of rotation is progressively changed as said rotary means advances axially relative to said mandrel.

12. In a device of the character described for cutting an exterior bevel on the end of a tubular object, the combination of: a mandrel for partial insertion in the end of said tubular object into fixed engagement with the tubular object, said mandrel having both a bearing portion and a tapered portion positioned to lie outside the tubular object; rotary means to rotatably telescope over said mandrel, said rotary means having a bearing portion cooperative with said bearing portion of the mandrel for axial guidance of the rotary means; cutting means; tool-holder means mounted on said rotary means, said tool-holder means carrying said cutting means and being movably mounted on the rotary means to shift said cutting means radially relative to the axis of rotation; and yielding means to urge said tool-holder means into contact with said tapered portion of the mandrel, whereby the distance of said cutting means from the axis of rotation is progressively changed as said rotary means advances axially relative to said mandrel, said cutting means being turned out of a plane perpendicular to the axis of rotation in a direction to cause the cutting action to feed said rotary means axially relative to said tubular object.

13. In a device of the character described for cutting an exterior bevel on the end of a tubular object, the combination of: a mandrel having a radially expansible portion for insertion into and engagement with the end of said tubular object, said mandrel having both a tapered portion and a cylindrical portion positioned to lie outside the tubular object; rotary means to rotatably telescope over said mandrel, said rotary means having a cylindrical portion to cooperate with said cylindrical portion of the mandrel for axial guidance of the rotary means; cutting means; tool-holder means mounted on said rotary means, said tool-holder means carrying said cutting means and being movably mounted on the rotary means to shift said cutting means relative to the axis of rotation; and yielding means to urge said tool-holder means into contact with said tapered portion of the mandrel, whereby the distance of said cutting means from the axis of rotation is progressively changed as said rotary means advances axially relative to said mandrel.

14. In a device of the character described, a combination as set forth in claim 9 in which said tool-holder means is pivotally mounted on said rotary means to swing toward and away from the axis of rotation of the rotary means, and in which said yielding means is a spring means acting between said tool-holder means and said rotary means.

15. In a device of the character described for cutting an exterior bevel on the end of a tubular object, the combination of: a radially expansible cylinder for insertion in the end of said tubular object; an axial member carrying said cylinder, said axial member having a tapered portion positioned to lie outside the tubular object when said expansible cylinder is inserted in the tubular object; means carried by said axial member to expand the inserted cylinder into engagement with the tubular object, thereby to fix said axial member relative to the tubular object; rotary means to rotatably engage said axial member for axial guidance thereby; cutting means; tool-holder means mounted on said rotary means, said tool-holder means carrying said cutting means and being movably mounted on the rotary means to shift said cutting means relative to the axis of rotation; and yielding means to urge said tool-holder means into contact with said tapered portion of said axial member, whereby the radial distance of said cutting means from the axis of said tubular object is progressively varied as said rotary means advances axially relative to said mandrel.

16. In a device of the character described a combination as set forth in claim 8 in which said rotary means is adjustable radially of said rotary means, whereby the device may be adapted to tubular objects of various diameters.

QUINTER E. BASHORE.